United States Patent
Huang

(10) Patent No.: US 7,532,552 B2
(45) Date of Patent: May 12, 2009

(54) METHOD FOR DISCRIMINATING OPERATION TYPE OF A DISK DEVICE

(75) Inventor: Shih-Jung Huang, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 635 days.

(21) Appl. No.: 11/279,568

(22) Filed: Apr. 13, 2006

(65) Prior Publication Data

US 2006/0239134 A1    Oct. 26, 2006

(30) Foreign Application Priority Data

Apr. 23, 2005   (TW) .............................. 94113106 A

(51) Int. Cl.
*G11B 5/58* (2006.01)

(52) U.S. Cl. .................................. 369/53.2; 369/30.27

(58) Field of Classification Search ........................ None
See application file for complete search history.

(56) References Cited

U.S. PATENT DOCUMENTS

| | | | | |
|---|---|---|---|---|
| 5,351,226 A | * | 9/1994 | Mizumoto et al. | 369/47.39 |
| 5,721,718 A | * | 2/1998 | Hwang | 369/53.23 |
| 5,825,729 A | * | 10/1998 | Ogasawara et al. | 369/44.27 |
| 6,229,773 B1 | * | 5/2001 | Chou | 369/44.28 |
| 6,252,834 B1 | * | 6/2001 | Kumagai | 369/44.29 |
| 2002/0126592 A1 | * | 9/2002 | Tsai | 369/44.35 |
| 2005/0141362 A1 | * | 6/2005 | Lin et al. | 369/44.28 |

\* cited by examiner

*Primary Examiner*—Joseph H Feild
*Assistant Examiner*—Henok G Heyi
(74) *Attorney, Agent, or Firm*—Winston Hsu

(57) ABSTRACT

A method for discriminating the operation type of a disk device uses an optical head carrying an objective lens. The gravity doesn't affect the control force of the optical head in the horizontal operation type, reduces the control force in a vertical operation type, and increases the control force in inverse operation type. Control forces based on various operation types forms different motion features of the optical head to discriminate the operation type. Damping characteristic parameters of each operation type of the optical head are previously determined by test first. The Control force is transported to the optical head, and the timer is reset. The displacement of the optical head is continuously detected till reaching a predetermined situation. The time of timer is read to compare with the threshold of each operation type for distinguishing the operation type.

16 Claims, 5 Drawing Sheets

(A)

(B)

(C)

METHOD FOR DISCRIMINATING OPERATION TYPE OF A DISK DEVICE

BACKGROUND OF THE INVENTION

1. Field of the Invention

The present invention relates to a method for discriminating the operation type of a disk device, and more particularly to a method used for detecting the horizontal, vertical, or inverse operation type of a disk device, in which a servo unit is affected by different gravities due to different assembly positions, in order to adjust the control performance of the servo unit.

2. Description of the Prior Art

In order to satisfy the application and room demand of various electric products, a disk device needs to be installed on many surfaces with different directions. However, the disk device reads/writes high density marks on a disc with high speed. The slight difference of the gravity acted on the servo unit in the disk device will change the control performance of the servo unit so as to affect the accuracy and efficiency of the disk device.

A conventional pick-up head 1 of a disk device is shown in FIG. 1. The pick-up head 1 includes a seat 2 which individually extends four elastic wires 3 from two sides to connect to two sides of an optical head 4 for supporting the float of the optical head 4. In the center, the optical head 4 carries an objective lens 5 which emits a laser beam onto marks of a disc (not shown) and receives the reflective beam from the disc. Each ends of the optical head 4 individually attaches a magnetic block 6 around which an actuator 7 is mounted. Besides, an L-shaped base plate 8 is extended from the seat 2 to carry the optical head 4. Opposite to the magnetic block 6, each end of the base plate 8 disposes a magnet 9. By the cooperation of the magnetic block 6, the actuator 7 and the magnet 9, the actuator 7 adjusts the magnitude and the direction of magnetic control force to drive the optical head 4. The optical head 4 supported by four wires 3 floats the objective lens 5 along the direction A to adjust the focusing servo, and along the direction B to fine adjust the tracking servo.

Since the disk device is horizontally disposed in general, the control performance affected by the gravity is adjusted only based on the horizontal type. In the direction A, the control force of the optical head 4 is the magnetic control force plus the gravity to achieve the normal control performance. In the direction B, because the gravity is vertical to the magnetic control force, the control force of the optical head 4 is able to normally control the performance without counting the factor of the gravity. When the disk device is disposed in a non-horizontal position, the control performance isn't suitable for the change of the gravity. Therefore, the conventional disk device currently utilizes a mechanical sensor to detect horizontal or vertical operation, but the mechanical sensor needs bigger room and increases the production cost. Another conventional disk device detects horizontal or vertical operation according to the change of focusing voltage to adjust the control performance. The disk device can't further detect the inverse or non-vertical operation and still can't correctly adjust the control performance based on the influence of various gravities, so the conventional disk device doesn't satisfy the demand of various electric products in which the disk device is disposed in various directions. Consequently, the conventional disk device still has the problem of discriminating the operation type to resolve.

SUMMARY OF THE INVENTION

It is one object of the invention to provide a method which discriminates the operation type of a disk device by providing the optical head with a predetermined control force to measure the time of traveling a constant distance.

It is another object of the invention to provide a method which discriminates the operation type of a disk device by providing the optical head with a step control force to measure the time of reaching the steady condition of the central error.

It is further object of the invention to provide a method which discriminates the operation type of a disk device without extra detecting sensors or switches to cut down the product cost.

For achieving the above objects, the present invention provides a method which discriminates the operation type of a disk device by use of an optical head carrying an objective lens. The gravity doesn't affect the control force of the optical head in the horizontal operation type, reduces the control force in a vertical operation type, and increases the control force in inverse operation type. Control forces based on various operation types forms different motion features of the optical head to discriminate the operation type. Damping characteristic parameters of each operation type of the optical head are previously determined by test first. The Control force is transported to the optical head, and the timer is reset. The displacement of the optical head is continuously detected till reaching a predetermined situation. The time of timer is read to compare with the threshold of each operation type for distinguishing the operation type.

During the detection, since the optical head is applied by several predetermined step control forces which have constant magnitude, and the control force bears different influences of gravity in the horizontal, vertical and inverse operation type, the total control forces of the optical head in various operation types are different. Therefore, the specific values of the traveling distance W, the control force F(t), and time $T_{w, F}^{min}$ of the optical head can be derived from the second order differential motion equation of the optical head $$T_{w,F}^{min} = \frac{WM\omega_d}{sup_t F(t)}$$

Wherein M is the mass of the optical head,
$\omega_d$ is the frequency resonance of the optical head, and
t is time.

Then, by using the characteristic parameter $\xi$ of the operation type of optical heads, $T_{w, F}^{min} \pm \xi$ is the range of the specific value of the operation type.

The method of present invention properly selects the traveling distance W, the control force F(t), and time $T_{w, F}^{min}$ as variables of detecting the operation type. By fixing the control force to push the optical heads, the method measures the time of traveling a predetermined distance, and compares specific values of operation types to discriminate the operation type. Besides, the method also pushes the optical heads 2 with a constant control force to discriminate the operation type by detecting the time of reaching the steady condition of central error and comparing specific values of operation types.

Further features and advantages of the invention, as well as the method and operation of various embodiments of the invention, are described in detail below with reference to the accompanying drawings.

BRIEF DESCRIPTION OF THE DRAWINGS

FIG. 3 (B) is a schematic view of the optical head in the vertical operation type affected by the gravity.

FIG. 3 (C) is a schematic view of the optical head in the inverse operation type affected by the gravity.

DETAILED DESCRIPTION

Figure 1:
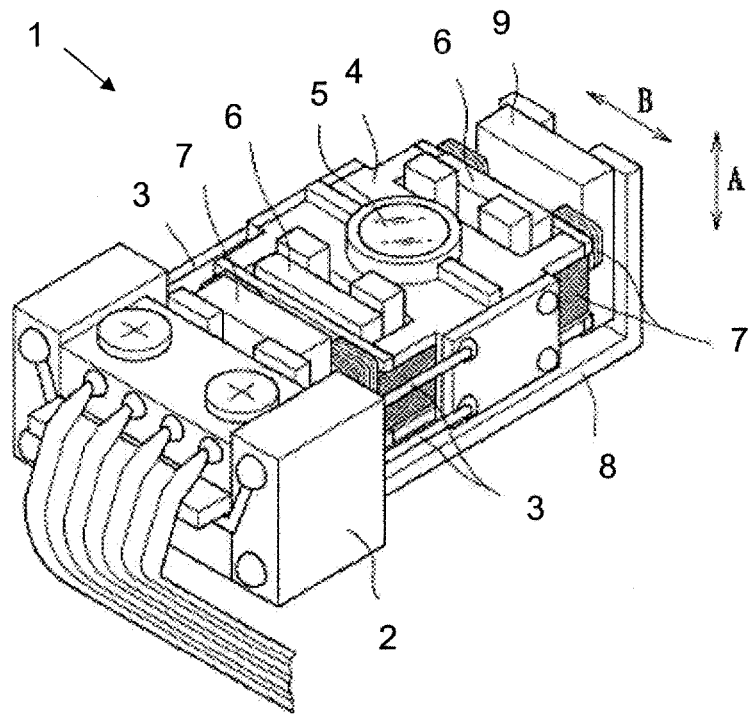
FIG. 1 is a perspective view of a conventional pick-up head of a disk device.
Figure 2:
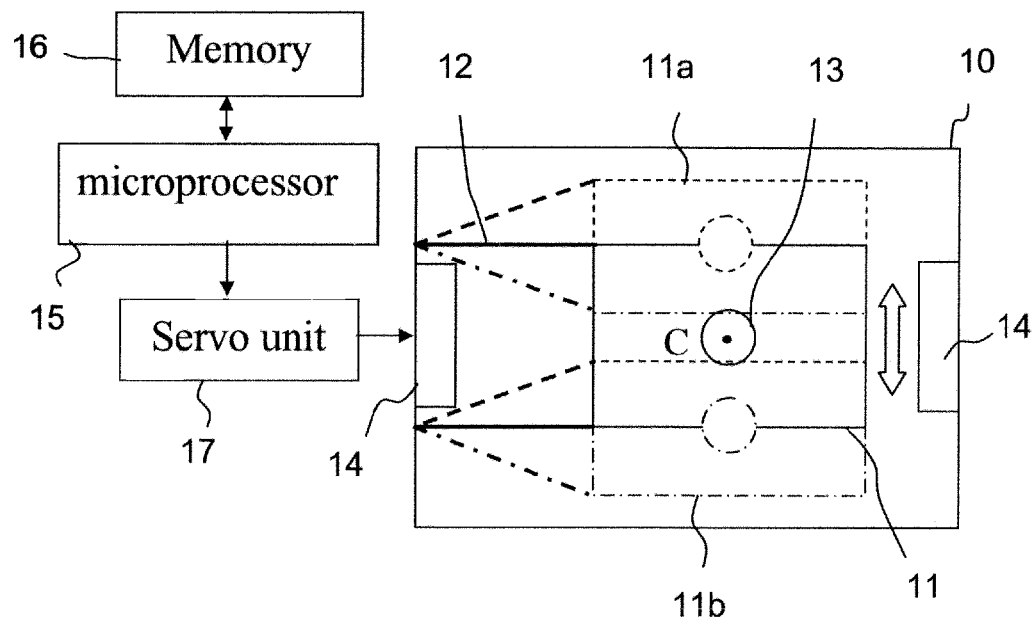
FIG. 2 is a schematic view of the movement of the optical head of the present invention.

Referring to FIG. 2, the movement of the optical head 11 of the present invention is shown. The method for discriminating the operation type of a disk device in the present invention detects the movement of the optical head 11 in a pick-up head 10 to distinguish the operation type of the disk device. The pick-up head 10 extends several metal wires 12 to connect with the optical head 11 so that the optical head 11 floats. An objective lens 13 is carried on the optical head 11, and a magnet 14 is individually attached on the front and back end of the optical head 11. By use of a predetermined detection mode stored in a memory 16, such as DRAM, a microprocessor 15 in the disk device controls a servo unit 17 to enable the pick-up head 10 to generate magnetic control forces. By cooperating with the magnets 14, the magnetic control forces push the optical head 11 to carry the objective lens 13 to move between two sides 11$a$, 11$b$ of the center of the pick-up head 10.

Figure 3:
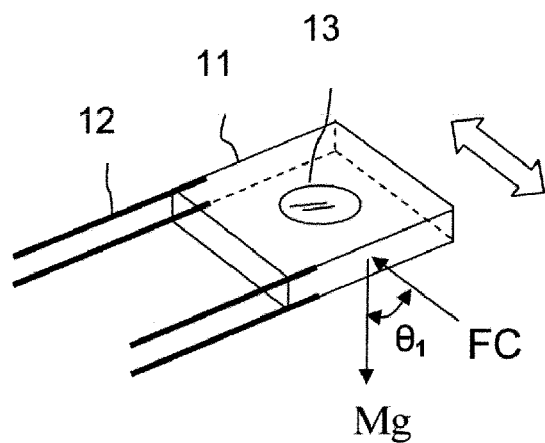
FIG. 3 (A) is a schematic view of the optical head in the horizontal operation type affected by the gravity.
Figure 3:
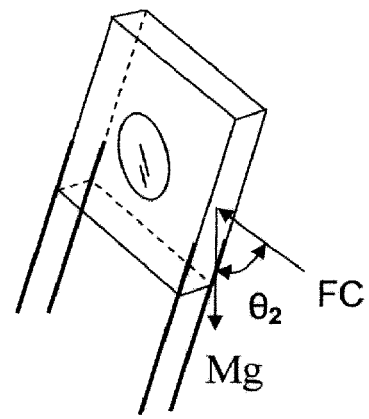
Figure 3:
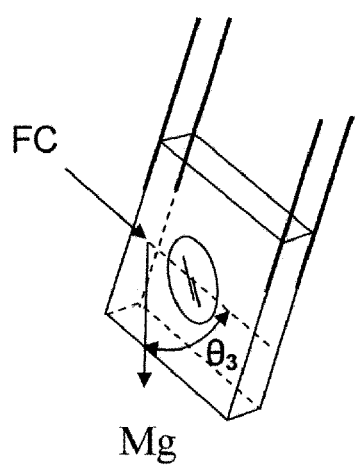

The relation of the gravity and the control force of the optical head 11 is shown in FIGS. 3(A)-3(C) when the disk device is individually installed in the horizontal, vertical or inverse operation types. When M indicates the mass of the optical head 11 and g indicates the acceleration of gravity, the gravity of the optical head 11 is Mg. As shown in FIG. 3(A), an angle θ1 formed between the direction of the control force FC applied on the optical head 11 and the direction of the gravity Mg of the optical head 11 is vertical when the disk device is in the horizontal operation type. The gravity Mg doesn't have the component of force along the direction of the control force FC, so the gravity Mg applied on the optical head 11 doesn't affect the control force FC. Therefore, the total control force FH equals to the control force FC applied by the optical head 11, i.e.

$$FH = FC \quad (1)$$

When the disk device is installed in the vertical operation type, as shown in FIG. 3(B), an angle θ2 is formed between the direction of the control force FC applied on the optical head 11 and the direction of the gravity Mg of the optical head 11. The component of the gravity Mg along the direction of the control force FC is Mg cos θ2, and the direction of the component Mg cos θ2 is opposite to the direction of the control force FC. Therefore, the control force FC is required to minus the component Mg cos θ2 to be the total control force FV of the optical head 11, i.e.

$$FV = FC - Mg \cos \theta2 \quad (2)$$

When the disk device is installed in the inverse operation type, as shown in FIG. 3(C), an angle θ3 is formed between the direction of the control force FC applied on the optical head 11 and the direction of the gravity Mg of the optical head 11. The component of the gravity Mg along the direction of the control force FC is Mg cos θ3, and the direction of the component Mg cos θ3 is the same as the direction of the control force FC. Therefore, the control force FC is required to plus the component Mg cos θ3 to be the total control force FR of the optical head 11, i.e.

$$FR = FC + Mg \cos \theta3 \quad (3)$$

If the control force FC applied on the optical head 11 is the same, by comparing the equations (1)-(3), the control force FC in the horizontal operation type isn't affected by the gravity Mg, and moves the optical head 11 with the same control force. However, the control force FC in the vertical operation type weakens due to the affluence of the gravity, and the control force FC in the inverse operation type increases. Consequently, the magnitude relation of each total control force is as follows:

$$FR > FH > FV \quad (4)$$

Figure 4:
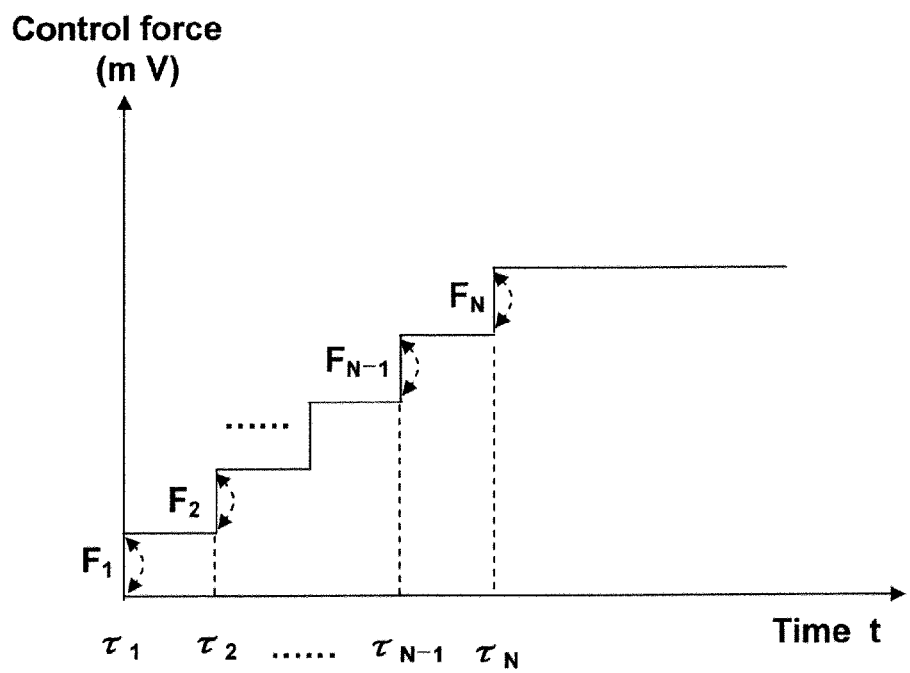
FIG. 4 is a chart of applying the step control force of the present invention.

Referring to FIG. 4, the first embodiment of the method for discriminating the operation type of a disk device in the present invention shows the step control force. The optical head 11 is applied at least one control force FC, which may be stepping and properly constant control force $F_1, F_2, \ldots, F_{N-1}, F_N$, to prevent the optical head 11 from vibrating during moving. The disk device drives the objective lens 13 to travel a predetermined distance W with the control force FC, and measures the traveling time to discriminate the operation type. Firstly, the movement of the optical head 11 is approached by a second order differential motion equation:

$$M\ddot{y}(t) + B\dot{y}(t) + Ky(t) = F(t) \quad (5\text{-}1)$$

$$\omega_n = \sqrt{K/M} \quad (5\text{-}2)$$

$$\zeta = \frac{B}{2\sqrt{MK}} \quad (5\text{-}3)$$

$$\omega_d = \omega_n \sqrt{1 - \zeta^2} \quad (5\text{-}4)$$

wherein y is the displacement of the optical head,
  M is the mass of the optical head,
  B is the equivalent damping coefficient along the direction of the control force,
  K is the equivalent elastic coefficient along the direction of the control force,
  $\omega_n$ is the nature frequency of the disk device,
  $\omega_d$ is the frequency resonance of the disk device,
  ζ is the damping rate of the disk device,
  F(t) is the total control force, and
  t is time.

Therefore, the stepping control force in FIG. 4 can be presented as follows:

$$F(t) = \sum_{i=1}^{N} F_i u(t - \tau_i) \quad (6)$$

wherein u is a standard step function. To solve the equations (5) and (6), 0<ζ<1 for example, the velocity of the optical head is as follows:

$$\dot{y}(t) = \sum_{i=1}^{N} \left(\frac{F_i}{M\omega_d}\right) \sin[\omega_d(t - \tau_i)] \exp[-\zeta\omega_n(t - \tau_i)] \quad (7)$$

Assuming the optical head 11 travels a distance W, the time required is $T_{w, F}$:

$$W = \int_{0}^{T_{w,F}} \dot{y}(t) dt \quad (8)$$

Taking the upper limit of W, $$|W| = \left| \int_{0}^{T_{w,F}} \dot{y}(t) dt \right| \quad (9)$$

$$\leq W = \int_{0}^{T_{w,F}} \dot{y}(t) dt$$

$$\leq \sum_{i=1}^{N} \int_{0}^{T_{w,F}} \left( \left|\frac{F_i}{M\omega_d}\right| |\sin[\omega_d(t-\tau_i)]| |\exp[-\zeta\omega_n(t-\tau_i)]| \right) dt$$

$$\leq \frac{1}{M\omega_d} \left( \sum_{i=1}^{N} F_i \right) \left( \int_{0}^{T_{w,F}} 1 dt \right)$$

$$\leq \left( \frac{\sup_{t} F(t)}{M\omega_d} \right) T_{w,F}$$

From the equation (9), the time required pushing the optical head 11 to travel the distance W must meet the following condition:

$$T_{w,F} \geq \frac{WM\omega_d}{\sup F(t)} \quad (10)$$

Therefore, the threshold of the time required is the lower limit of $T_{w, F}$:

$$T_{w,F}^{\min} \geq \frac{WM\omega_d}{\sup F(t)} \quad (11)$$

According to the equation (11), the time $T_{w, F}^{min}$ required traveling the constant distance W is in inverse proportion to the total control force F(t). If the equation (4) is substituted into the equation (11), the threshold of the time required for the horizontal, vertical, or inverse operation type can be achieved. The relation is $$T_{w, FR}^{min} < T_{w, FH}^{min} < T_{w, FV}^{min} \quad (12)$$

Therefore, due to those thresholds for each operation type obtained from the equation (11), step control forces previously saved in the memory 16 are used to push the optical head 11 to travel the predetermined distance W. Because of different operation types, the disk device has the different total control force to cause the different traveling velocity of the optical head 11. Consequently, the time required traveling the predetermined distance W is different for each operation type, and the operation type can be discriminated.

Figure 5:
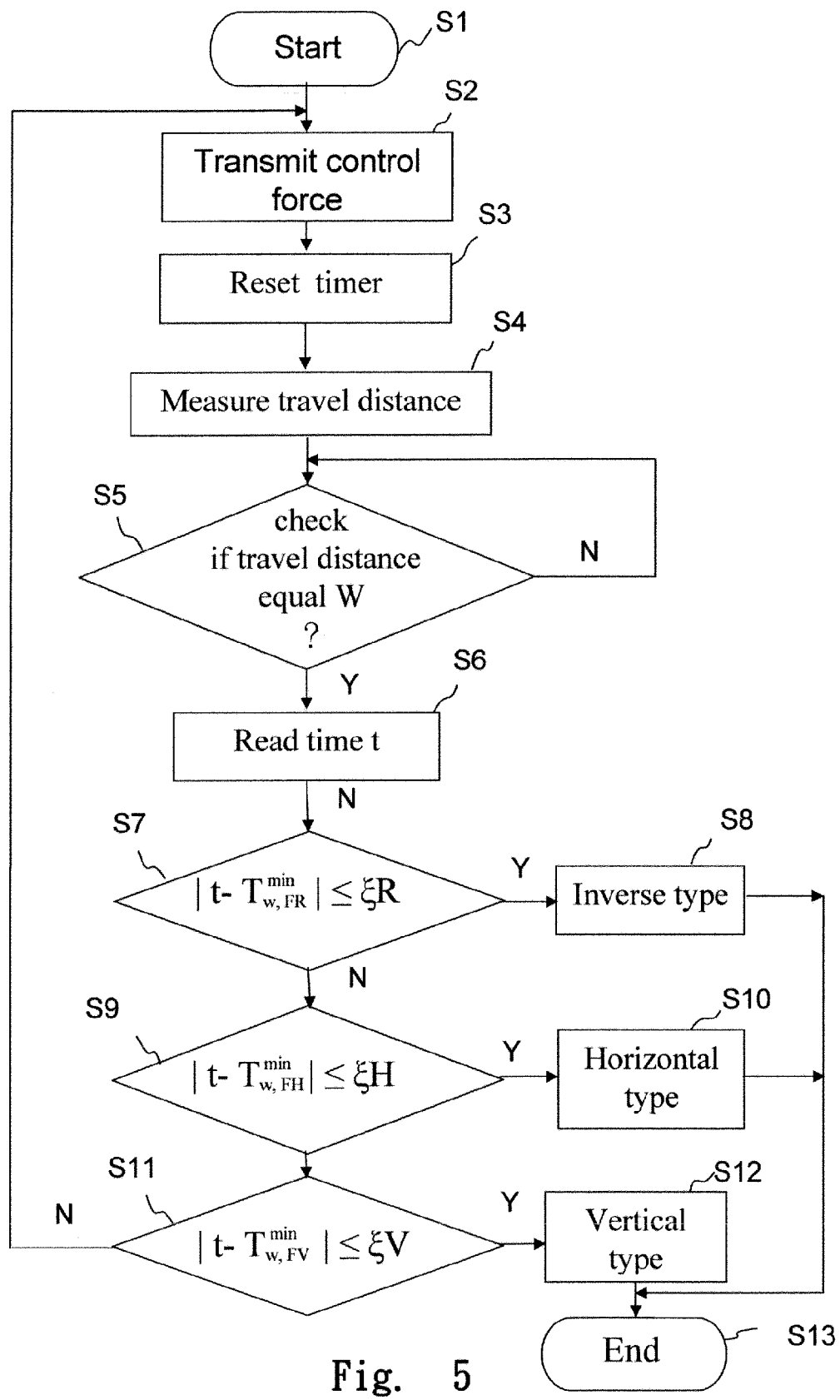
FIG. 5 is a flow chart of the first embodiment of the method for discriminating the operation type of a disk device in the present invention.

The steps of the method for discriminating the operation type of a disk device according to the present invention is shown in FIG. 5. When the step S1 begins to detect, the damping characteristic parameters of the optical head are first tested and determined because different damping rates will affect the thresholds $T_{w, F}^{min}$. For example, the damping characteristic parameters of the inverse, horizontal, and vertical operation type are individually referred to as ξR, ξH, and ξV. In the step S2, the microprocessor 15 transmits the predetermined step control force from the memory 16 to the servo unit 17 to control the movement of the optical head 11. Meanwhile, the step S3 resets and times the timer. Then, the step S4 measures the traveling distance of the optical head. The step S5 checks if the traveling distance of the optical head 11 equals to the predetermined distance W. If the traveling distance doesn't equal to the predetermined distance W, the step S5 repeats to check. Till the traveling distance equals to the predetermined distance W, the method enters the step S6 to read the time t of the timer. The step S7 compares the time t with the threshold of the inverse operation type, i.e. $|t-T_{w, FR}^{min}| \leq \xi R$. If the time t is in the range, the step S8 decides that the disk device is at the inverse operation type, and the method enters the step S13 to finish. Otherwise the method enters the step S9 to check $|t-T_{wm, FH}^{min}| \leq \xi H$. If the time t is in the range, the step S10 decides that the disk device is at the horizontal operation type, and the method enters the step S13 to finish. If the time t isn't in the range, the method enters the step S11 to check $|t-T_{w, FV}^{min}| \leq \xi V$. If the time t is in the range, the step S12 decides that the disk device is at the vertical operation type, and the method enters the step S13 to finish. If the time t isn't in the range, the method returns to the step 2 to repeat the above steps.

Since the disk device has the different total control force based on the different operation type, the method compares the time required traveling the predetermined distance W with the thresholds and checks which range the time locates. Therefore, the method can discriminate the inverse, horizontal, or vertical operation type without extra detectors and switches. Furthermore, the above result is derived from 0<ζ<1, but the same relation of the equation (12) can be obtained to discriminate the inverse, horizontal, or vertical operation type when ζ=1.

Figure 6:
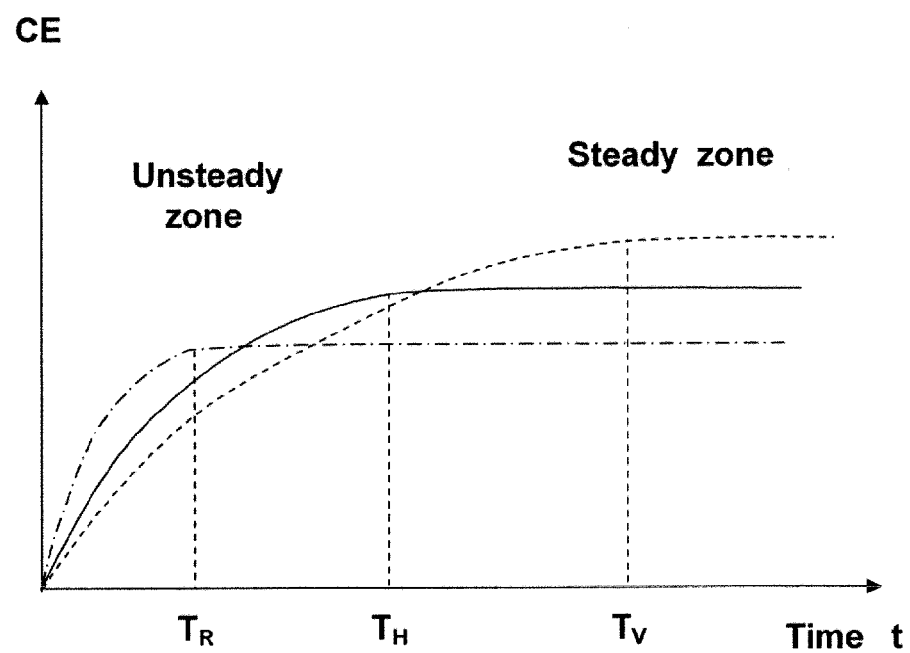
FIG. 6 is a chart of the steady condition of the central error in the second embodiment of the present invention.

The second embodiment of the method for discriminating the operation type of a disk device according to the present invention uses a CE (Center Error) to substitute for the traveling distance of the first embodiment. Referring to FIG. 2, the CE is a displacement of the optical head 11 against the center C of the pick-up head 10. Therefore, the relation of the CE and the time seems like the relation of the traveling distance and time of the first embodiment. At the same concepts as the first embodiment, the optical head 11 is applied a constant step control force $F_1, F_2, \ldots, F_{N-1}, F_N$ to push the objective lens 13. Referring to FIG. 6, for example, the horizontal operation type is shown as the solid line. Due to the inertia of the optical head, the control force can't reach the force balance at the beginning so that the optical head moves unevenly. The CE gradually increases to form an unsteady zone. Until the force applied to the optical head reaches balance, i.e. the time reaches time TH, the CE enters a steady zone, and the time TH is a lower threshold for the operation type. Therefore, the bigger control force can enter the steady zone in shorter time. From the equation (4) of the first embodiment, the relation of the control force of the horizontal, vertical, and inverse operation type of the disk device is FR>FH>FV. So the horizontal, vertical, and inverse operation type individually has the different time threshold TH, TV, and TR to enter the steady zone, and the relation is TV>TH>TR. By mean of the above relation, the method can discriminate three operation types of the disk device.

Figure 7:
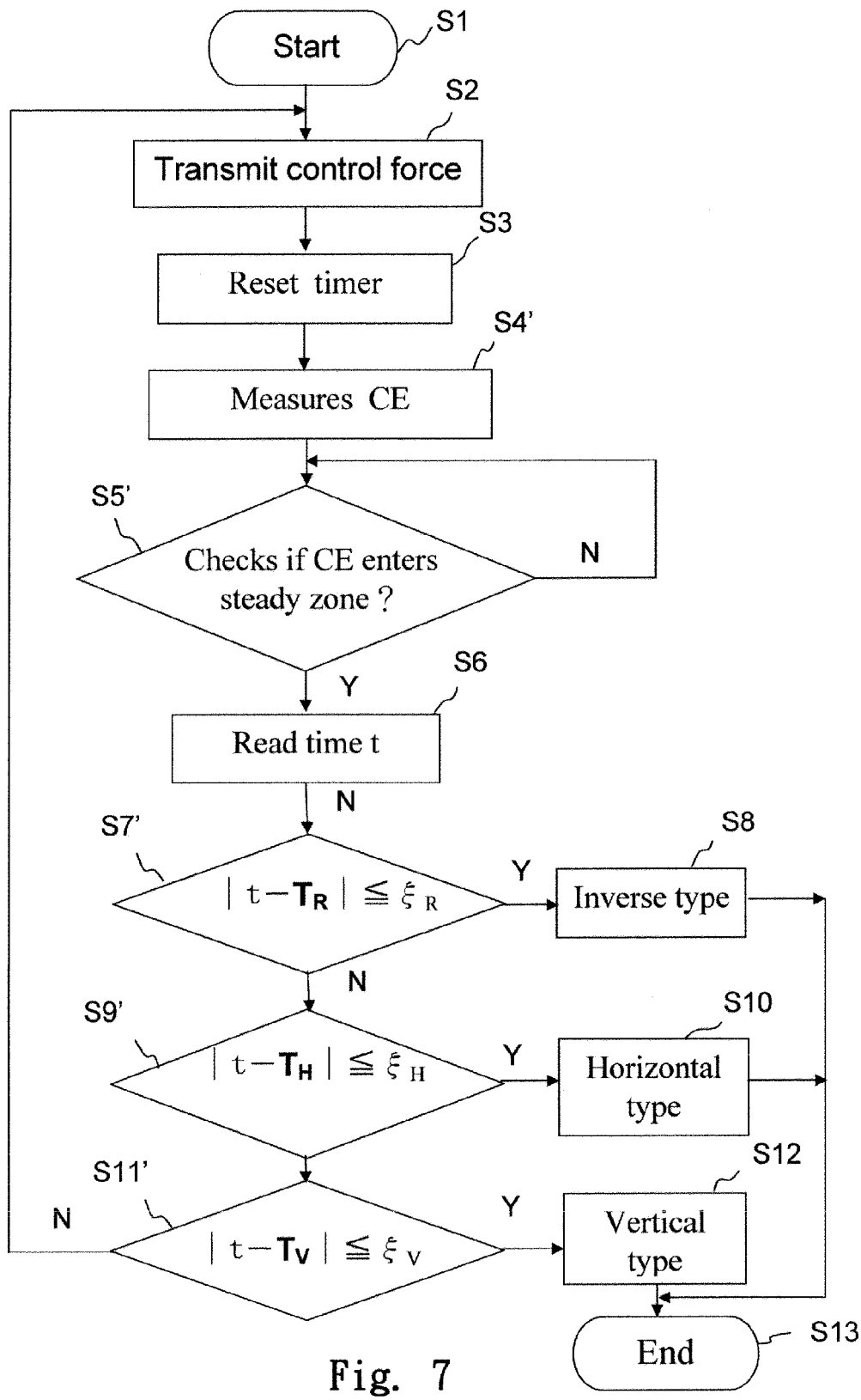
FIG. 7 is a flow chart of the second embodiment of the method for discriminating the operation type of a disk device in the present invention.

The steps of the method for discriminating the operation type of a disk device according to the second embodiment is shown in FIG. 7. The damping characteristic parameters $\xi_R$, $\xi_H$, and $\xi_V$ of the optical head are first tested and determined, and the time thresholds TH, TV, and TR of operation types are tested and determined too. Basically, the steps of the second embodiment are the same as the steps of the first embodiment, but there are some differences in step 4', 5', 7', 9', and 11'. The step 4' measures the change of the CE. The step 5' checks if the CE enters the steady zone. Once the CE enters the steady zone, the step 6 read the time t. Then, the method compares the time t with $|t-T_R| \leq \xi_R$, $t-T_H| \leq \xi_H$, and $|t-T_V| \leq \xi_V$ in step 7', 9', and 11', and determines which range the time t locates to decide the operation type. Therefore, the embodiment only needs to check the change of the CE to discriminate operation types without other detections and calculation. Thus, the discriminating method can be simplified.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for discriminating the operation type of a disk device, comprising the steps of:
    applying at least one control force to an optical head;
    resetting and timing a timer;
    measuring the movement of the optical head;
    checking if the movement reaches a predetermined limitation;
    reading the time of the time till the movement reaches the predetermined limitation;
    comparing the time with each threshold of operation types; and
    deciding the operation type if the time is in the range of thresholds.

2. The method of claim 1, further comprising a step of testing and determining damping characteristic parameters $\xi$ for operation types before the optical head begins discriminating the operation type.

3. The method of claim 2, wherein each operation type has its damping characteristic parameter.

4. The method of claim 2, wherein the threshold $T_{w,f}^{min}$ of operation types is derived as follows:

$$T_{w,F}^{min} = \frac{WM\omega_d}{\sup_t F(t)}$$

W: a predetermined traveling distance;
M: the mass of the optical head;
$\omega_d$: the frequency resonance of the disk device;
F: the total control force; and
t: the time.

5. The method of claim 4, wherein said each threshold $T_{w,F}^{min}$ of operation types extends to the damping characteristic parameters $\pm\xi$ to form the threshold ranges.

6. The method of claim 1, wherein the operation types includes inverse, horizontal, and vertical operation types.

7. The method of claim 1, wherein the control force is a step control force.

8. The method of claim 1, wherein the control force has a predetermined amount.

9. The method of claim 1, wherein the magnitude of the control force is constant.

10. The method of claim 1, wherein the step of measuring the movement of the optical head is to measure the traveling distance.

11. The method of claim 10, wherein the predetermined limitation is a predetermined distance.

12. The method of claim 1, wherein the step of measuring the movement of the optical head is to measure the center error.

13. The method of claim 12, wherein the predetermined limitation is a steady zone of the center error.

14. The method of claim 13, wherein the threshold of the time which the center error enters the steady zone is the lower limit.

15. The method of claim 1, wherein the step of timing the timer begins to time when the control force is applied to the optical head.

16. The method of claim 1, wherein the step of deciding the operation type further comprises a step of returning to the beginning step of the method if the time t isn't in the range.

* * * * *